US012618969B2

(12) United States Patent　　　　(10) Patent No.:　　US 12,618,969 B2
Gao　　　　　　　　　　　　　　　　(45) Date of Patent:　　　　May 5, 2026

(54) RANGE AND RANGE RATE ESTIMATION FOR STEPPED FREQUENCY WAVEFORM WITH CONSTANT PULSE REPETITION PERIOD

(71) Applicant: Aptiv Technologies AG, Schaffhausen (CH)

(72) Inventor: Boyi Gao, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 11 days.

(21) Appl. No.: 18/369,868

(22) Filed: Sep. 19, 2023

(65) Prior Publication Data

US 2025/0093497 A1　　Mar. 20, 2025

(51) Int. Cl.
*G01S 13/931*　　　(2020.01)
*B60W 10/04*　　　(2006.01)
　　　　　(Continued)

(52) U.S. Cl.
CPC ........... *G01S 13/931* (2013.01); *B60W 10/04* (2013.01); *B60W 10/18* (2013.01); *B60W 10/20* (2013.01);
　　　　　(Continued)

(58) Field of Classification Search
CPC ......................... G01S 13/931; B60W 60/001
See application file for complete search history.

(56) References Cited

U.S. PATENT DOCUMENTS 10,585,171 B2 * 3/2020 Oswald ................... G01S 13/87
2015/0160331 A1 * 6/2015 Lynch ..................... G01S 13/02
　　　　　　　　　　　　　　　　　　　　342/128
(Continued)

FOREIGN PATENT DOCUMENTS

EP　　　　4202489 A1　　6/2023

OTHER PUBLICATIONS

Extended European Search Report regarding European Patent Application No. 24178252.3, dated Oct. 31, 2024.
(Continued)

*Primary Examiner* — Jess Whittington
(74) *Attorney, Agent, or Firm* — Harness, Dickey & Pierce, P.L.C.

(57)　　　　　　ABSTRACT

Systems and methods are provided and include a radar system that transmits radar signals within frames having radar chirps. The radar chirps have a stepped frequency waveform such that the initial and end frequencies are changed for subsequent chirps and have a constant pulse repetition period between chirps. The radar system performs range fast Fourier transform (FFT) processing and Doppler FFT processing on receive values corresponding to reflected signals from an object. The radar system estimates range and range-rate information about the object based on range FFT values and Doppler FFT values using a signal model and determines information about the object based on the estimated range and range-rate information. The signal model includes (1) a fast-time dimension term corresponding to samples within a radar chirp and (2) a slow-time dimension term corresponding to individual radar chirps within the frame, with the slow-time dimension term including a second degree term.

2 Claims, 15 Drawing Sheets

(51) Int. Cl.

| | |
|---|---|
| B60W 10/18 | (2012.01) |
| B60W 10/20 | (2006.01) |
| B60W 60/00 | (2020.01) |
| G01S 7/35 | (2006.01) |

(52) U.S. Cl.
CPC ........... B60W 60/001 (2020.02); G01S 7/354 (2013.01); B60W 2420/408 (2024.01); B60W 2554/4041 (2020.02); B60W 2554/4042 (2020.02); B60W 2710/18 (2013.01); B60W 2710/20 (2013.01); G01S 2013/9318 (2020.01); G01S 2013/93185 (2020.01); G01S 2013/9319 (2020.01)

(56) References Cited

U.S. PATENT DOCUMENTS

| | | | | |
|---|---|---|---|---|
| 2018/0011170 A1* | 1/2018 | Rao | ........................ | G01S 7/354 |
| 2019/0129004 A1* | 5/2019 | Jaeger | ....................... | G01S 7/03 |
| 2019/0137602 A1* | 5/2019 | Longman | ................ | G01S 13/42 |
| 2020/0249315 A1* | 8/2020 | Eshet | .................... | G01S 13/343 |
| 2020/0408878 A1* | 12/2020 | Liang | ...................... | G01S 7/354 |
| 2021/0293948 A1* | 9/2021 | Peng | ...................... | G01S 13/345 |
| 2022/0094397 A1* | 3/2022 | Wu | ....................... | H04B 7/0617 |
| 2022/0196795 A1* | 6/2022 | Wu | ........................ | G01S 7/354 |
| 2023/0194657 A1* | 6/2023 | Gao | .......................... | G01S 7/32 |
| | | | | 342/73 |
| 2023/0194705 A1* | 6/2023 | Gao | ...................... | G01S 13/931 |
| | | | | 342/70 |
| 2023/0305103 A1* | 9/2023 | Nam | ..................... | G01S 13/325 |
| 2024/0361445 A1* | 10/2024 | Paker | ...................... | G01S 13/42 |
| 2025/0035740 A1* | 1/2025 | Ramachandran | ..... | G01S 13/582 |

OTHER PUBLICATIONS

Ruiqi Tian et al., "A Velocity Esimation Algorithm for Stepped Frequency Radar Combining Keystone Transform and Radon Transform," 2017 Sixth Asia-Pacific Conference on Antennas and Propagation (APCAP), IEEE, Oct. 16, 2017.

J. Mu, et al., "Velocity Compensation Method Based on Extended Keystone Transform for Modulated Stepped-frequency Radar," 2011 IEEE CIE International Conference, dated Oct. 24, 2011.

* cited by examiner

Time Vector for chirps within a frame – $t_{chirp}$

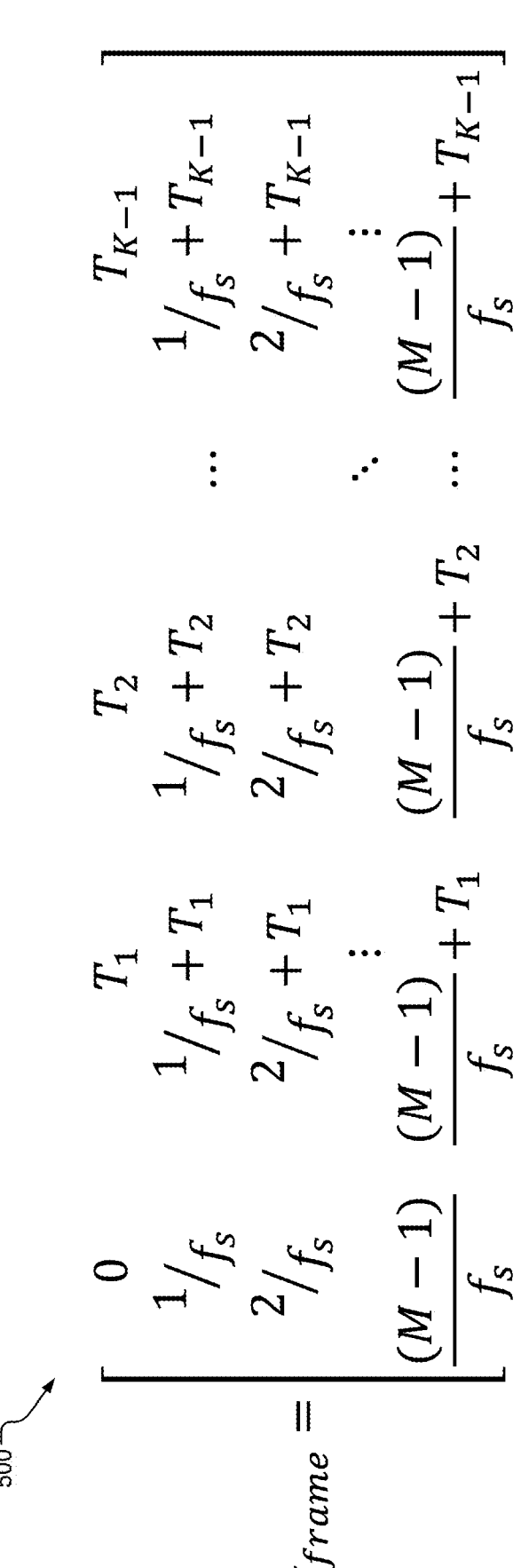

Time Vector for whole frame – $t_{frame}$

$$t_{frame} = \begin{bmatrix} 0 & T_1 & T_2 & T_{K-1} \\ 1/f_s & 1/f_s + T_1 & 1/f_s + T_2 & 1/f_s + T_{K-1} \\ 2/f_s & 2/f_s + T_1 & 2/f_s + T_2 & 2/f_s + T_{K-1} \\ \cdots & \cdots & \cdots & \cdots \\ \frac{(M-1)}{f_s} & \frac{(M-1)}{f_s} + T_1 & \frac{(M-1)}{f_s} + T_2 & \frac{(M-1)}{f_s} + T_{K-1} \end{bmatrix}$$

K = number of chirps per frame

M = number of samples per chirp $f_s$ = sampling rate $1/f_s$ = sampling time $T_k$ = time delay of the $k^{th}$ chirp from the start of the frame

$$\frac{\Phi_{IF}}{2\pi} = \frac{\Phi_{rx}}{2\pi} - \frac{\Phi_{tx}}{2\pi}$$

$$\approx -\frac{2 \cdot f_{start} \cdot R}{c} - \frac{2 \cdot S \cdot t_{chirp} \cdot R}{c} \quad \text{(with higher order terms omitted)}$$

$$-\frac{2 \cdot f_{start} \cdot t_{frame} \cdot v}{c} - \frac{2 \cdot S \cdot t_{chirp} \cdot t_{frame} \cdot v}{c}$$

$$+\frac{4 \cdot S \cdot t_{frame} \cdot R \cdot v}{c^2}$$

$$= -\frac{2 \cdot R}{c}\left(f_{start} + S \cdot t_{chirp}\right) \quad \text{(Terms contain R)}$$

$$-\frac{2 \cdot v}{c}\left(f_{start} + S \cdot t_{chirp}\right) \cdot t_{frame} \quad \text{(Terms contain v)}$$

FIG. 6

The $m^{\text{th}}$ sample in the $k^{\text{th}}$ chirp $(m = 0,1,2,...,M - 1; k = 0,1,2,...,K - 1)$v $$\frac{\Phi_{IF}}{2\pi}(m,k) = -\frac{2 \cdot R}{c}\left(f_{start}(k) + S \cdot t_{chirp}(m)\right)$$

$$-\frac{2 \cdot v}{c}\left(f_{start}(k) + S \cdot t_{chirp}(m)\right) \cdot t_{frame}(m,k)$$

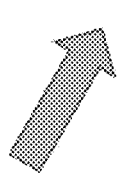

$$\frac{\Phi_{IF}}{2\pi}(m,k) =$$

$$-\frac{2 \cdot R}{c}\left(f_0 + k \cdot \Delta f + S \cdot \frac{m}{f_s}\right)$$

$$-\frac{2 \cdot v}{c}\left(f_0 + k \cdot \Delta f + S \cdot \frac{m}{f_s}\right) \cdot \left(\frac{m}{f_s} + T_k\right)$$

Substitutions:

$$f_{start}(k) = f_0 + k \cdot \Delta f$$

$$t_{chirp}(m) = \frac{m}{f_s}$$

$$t_{frame}(m,k) = \frac{m}{f_s} + T_k$$

FIG. 7

RANGE AND RANGE RATE ESTIMATION FOR STEPPED FREQUENCY WAVEFORM WITH CONSTANT PULSE REPETITION PERIOD

FIELD

The present disclosure relates to radar systems and methods and, more particularly, to radar systems and methods that determine range and range rate estimates for a stepped frequency waveform having a constant pulse repetition period.

BACKGROUND

This section provides background information related to the present disclosure which is not necessarily prior art.

Automotive radar sensors are used in vehicle sensing systems to determine information about objects in the environment of the vehicle, such as the location, size, orientation, velocity, and acceleration of objects in the environment of the vehicle. The sensed information can, for example, be used by other vehicle systems, such as autonomous driving systems and/or advanced driver assistance systems (ADAS), etc., to control steering, braking, throttle, and/or other vehicle systems.

A radar system may transmit a number of radar chirps within a particular transmit frame and then receive signals corresponding to the transmitted chirps within the transmit frame reflected from an object within the environment of the vehicle. The frequency of the radar signal may vary during each individual chirp. For example, in some radar systems the transmitted signal may start at an initial frequency and then increase or decrease over the time period of the chirp to an end frequency. In some conventional radar systems, the initial frequency and the end frequency of each chirp can stay the same for each chirp over the course of the transmit frame. Other radar systems, however, may utilize a stepped frequency waveform such that the initial frequencies and end frequencies of the transmitted signals change from chirp to chirp. For example, a radar system may utilize a step-down frequency waveform such that the initial frequency and end frequency of each subsequent chirp is lower than the initial frequency and end frequency of the previous chirp. Alternatively, a radar system may utilize a step-up frequency waveform such that the initial frequency and end frequency of each subsequent chirp is higher than the initial frequency and end frequency of the previous chirp.

Additionally, in some radar systems the time period between each chirp, referred to as the pulse repetition period ("PRP"), can remain constant for all chirps within a transmit frame. Alternatively, other radar systems can be configured to vary the PRP between chirps over the transmit frame such that the time between chirps changes over the course of the transmit frame.

Radar systems can use signal models to process received radar signals reflected off of an object and determine range and range rate information of the object. Using a signal model developed for stepped frequency waveforms with variable PRP in a radar system that utilizes a constant PRP, however, can introduce errors.

SUMMARY

This section provides a general summary of the disclosure and is not a comprehensive disclosure of its full scope or all of its features.

In accordance with the present disclosure, a radar system comprising a processor and memory configured to transmit radar signals within at least one frame having a plurality of radar chirps, the plurality of radar chirps having a stepped frequency waveform such that an initial transmit frequency and an end transmit frequency is changed for each subsequent chirp within the plurality of radar chirps, and the plurality of radar chirps having a constant pulse repetition period between chirps. The processor and memory are further configured to receive and sample radar signals reflected from at least one object to generate receive values from the received and sampled radar signals. The processor and memory are further configured to perform range fast Fourier transform (FFT) processing and Doppler FFT processing on the receive values to generate range FFT values and Doppler FFT values. The processor and memory are further configured to estimate range and range-rate information about the at least one object based on the range FFT values and Doppler FFT values using a signal model. The processor and memory are further configured to determine information about the object based on the estimated range and range-rate information, the information about the object including at least one of a location, a size, an orientation, a velocity, and an acceleration of the at least one object. The signal model includes (1) at least one fast-time dimension term that corresponds to individual receive samples within each radar chirp of the plurality of radar chirps and (2) at least one slow-time dimension term that corresponds to individual radar chirps within the plurality of radar chirps, and the at least one slow-time dimension term includes at least one second degree term corresponding to individual radar chirps within the plurality of radar chirps.

In other features, the at least one slow-time dimension term is quadratic.

In other features, the at least one slow-time dimension term includes an index for the individual radar chirps within the plurality of radar chirps.

In other features, the at least one fast-time dimension term includes at least one second degree term that corresponds to individual receive samples within each radar chirp of the plurality of radar chirps.

In other features, the at least one fast-time dimension term is quadratic.

In other features, the at least one fast-time dimension term includes an index for the individual receive samples within each radar chirp of the plurality of radar chirps.

In other features, the signal model includes at least one coupling term that includes both at least one fast-time dimension term that corresponds to individual receive samples within each radar chirp of the plurality of radar chirps and at least one slow-time dimension term that corresponds to individual radar chirps within the plurality of radar chirps.

In other features, the radar system is located in a vehicle and the information about the object is communicated to a vehicle system that controls at least one of a steering system, a braking system, and a throttle system of the vehicle based on the information about the object.

In other features, the vehicle system includes at least one of an autonomous driving system and a driver assistance system.

In accordance with the present disclosure, a method is provided and includes transmitting, with a radar system having a processor and memory, radar signals radar signals within at least one frame having a plurality of radar chirps, the plurality of radar chirps having a stepped frequency waveform such that an initial transmit frequency and an end transmit frequency is changed for each subsequent chirp within the plurality of radar chirps and the plurality of radar chirps having a constant pulse repetition period between chirps. The method further includes receiving and sampling, with the radar system, radar signals reflected from at least one object to generate receive values from the received and sampled radar signals. The method further includes performing, with the radar system, range fast Fourier transform (FFT) processing and Doppler FFT processing on the receive values to generate range FFT values and Doppler FFT values. The method further includes estimating, with the radar system, range and range-rate information about the at least one object based on the range FFT values and Doppler FFT values using a signal model. The method further includes determining, with the radar system, information about the object based on the estimated range and range-rate information, the information about the object including at least one of a location, a size, an orientation, a velocity, and an acceleration of the at least one object. The signal model includes (1) at least one fast-time dimension term that corresponds to individual receive samples within each radar chirp of the plurality of radar chirps and (2) at least one slow-time dimension term that corresponds to individual radar chirps within the plurality of radar chirps. The at least one slow-time dimension term includes at least one second degree term corresponding to individual radar chirps within the plurality of radar chirps.

In other features, the at least one slow-time dimension term is quadratic.

In other features, the at least one slow-time dimension term includes an index for the individual radar chirps within the plurality of radar chirps.

In other features, the at least one fast-time dimension term includes at least one second degree term that corresponds to individual receive samples within each radar chirp of the plurality of radar chirps.

In other features, the at least one fast-time dimension term is quadratic.

In other features, the at least one fast-time dimension term includes an index for the individual receive samples within each radar chirp of the plurality of radar chirps.

In other features, the signal model includes at least one coupling term that includes both at least one fast-time dimension term that corresponds to individual receive samples within each radar chirp of the plurality of radar chirps and at least one slow-time dimension term that corresponds to individual radar chirps within the plurality of radar chirps.

In other features, the radar system is located in a vehicle and the information about the object is communicated to a vehicle system that controls at least one of a steering system, a braking system, and a throttle system of the vehicle based on the information about the object.

In other features, the vehicle system includes at least one of an autonomous driving system and a driver assistance system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

FIG. 5 illustrates values for a time vector of a frame of radar chirps in accordance with the present disclosure.

FIG. 6 illustrates equations for a signal model in accordance with the present disclosure.

FIG. 7 illustrates additional equations for a signal model in accordance with the present disclosure.

Figure 1:
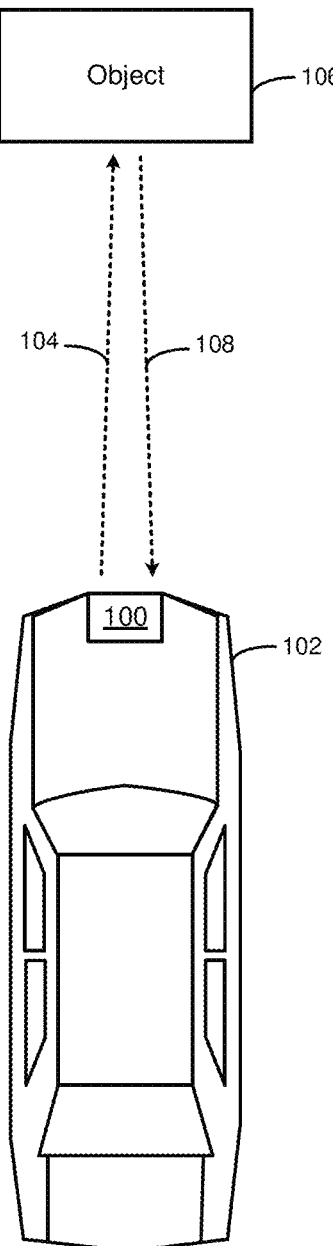
FIG. 1 is a block diagram of a vehicle having a radar system in accordance with the present disclosure.

FIGS. 8A, 8B, 9A, and 9B illustrate resulting range and range rate errors when using prior signal models developed for a stepped-frequency waveform (SFW) having a varied PRP in a radar system that utilizes an SFW with a constant PRP.

FIGS. 10A, 10B, 11A, and 11B illustrate resulting range and range rate errors when using signal models in accordance with the present disclosure.

Corresponding reference numerals indicate corresponding parts throughout the several views of the drawings.

DETAILED DESCRIPTION

Example embodiments will now be described more fully with reference to the accompanying drawings.

The present disclosure is directed to radar systems that transmit radar signals by changing a frequency of radar chirps within a transmit frame according to a stepped-frequency waveform, such that the initial and ending frequencies of each subsequent chirp is either increased or decreased from the previous chirp. In addition, the radar systems of the present disclosure can transmit radar chirps using a constant pulse repetition period (PRP) between each of the chirps within each transmit frame. The radar systems of the present disclosure perform a ranging fast Fourier transform (FFT) and a Doppler FFT of received signals reflected from an object using a signal model, as discussed in further detail below. In particular, radar systems in accordance with the present disclosure utilize a signal model to process received signals in a fast-time dimension corresponding to the time period of an individual chirp and in a slow-time dimension corresponding to the time period of an individual transmit frame. As discussed in further detail below, the signal model for processing received signals in accordance with the present disclosure includes a higher order term, such as a second degree term, in both the fast-time dimension and the slow-time dimension, which beneficially reduces the range rate errors as compared with previous models used with radar systems having a constant PRP.

Figure 2:
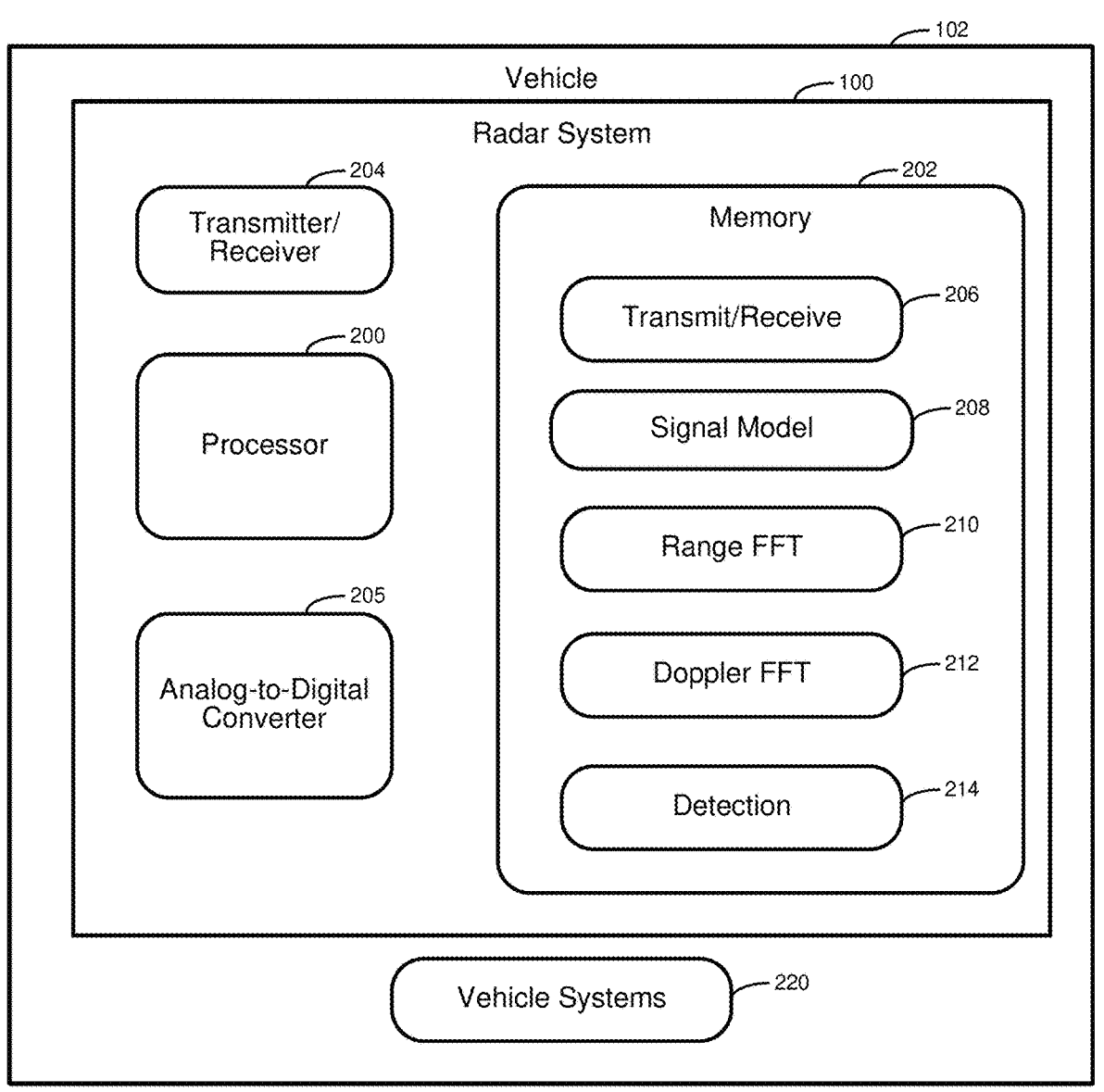
FIG. 2 is another block diagram of a vehicle having a radar system in accordance with the present disclosure.

With reference to FIGS. 1 and 2, a radar system 100 of a vehicle 102 in accordance with the present disclosure is shown. The radar system 100 transmits signals 104 that are reflected off of an object 106 in the environment of the vehicle 102. While a single object 106 is shown for purposes of illustration in FIG. 1, in practice the object 106 may comprise multiple objects. The radar system 100 receives signals 108 that are reflected from the object 106. Based on characteristics of the received signals 108, the radar system 100 determines information about the object, such as range and range rate, which is subsequently used to determine the location, size, orientation, velocity and acceleration of the object 106.

The radar system 100 includes a processor 200 and memory 202 that stores code executed by the processor 200 to perform the required functionality for transmitting and receiving signals 104, 108 and determining information about the object 106 based on the characteristics of the received signals 108. While the example implementation illustrates a single processor 200, multiple processors and/or modules working together can alternatively be used. The radar system 100 includes a transmitter/receiver 204 that transmits and receives the signals 104, 108. The transmitter/receiver 204 includes one or more transmit (Tx) antennas and one or more receive (Rx) antennas for transmitting and receiving signals 104, 108. The processor 200, for example, executes transmit/receive code 206 stored in memory 202 to transmit and receive the signals 104, 108. The memory 202 also stores information for a signal model 208. The memory 202 also stores code 210 used by the processor 200 to perform a range FFT and code 212 for performing a Doppler FFT on received radar signals 108 using the signal model 208. As discussed in further detail below, the processor 200 determines range and range-rate information about the object 106 based on performing the range FFT and Doppler FFT on the received radar signals 108, respectively. For example, the processor 200 performs range FFT using the range FFT code 210 to generate a range index and performs Doppler FFT using the Doppler FFT code 212 to generate a Doppler index. The processor 200 then uses the signal model 208 to process the range and Doppler indexes to determine the range and range rate, respectively. In addition, the memory 202 also stores code 214 used by the processor 200 to perform object detection to determine information about the object 106 based on the determined range and range-rate information. The processor 200 can then communicate the information about the object 106, such as the location, size, orientation, velocity and acceleration of the object 106 determined based on the range and range-rate information, to other vehicle systems 220, such as autonomous driving systems and/or advanced driver assistance systems (ADAS), etc. The other vehicle systems 220 can then utilize and process the information about the object 106 to appropriately control steering, braking, throttle, and/or other vehicle operations of the vehicle 102 based on the information about the object 106.

The radar system 100 also includes an analog-to-digital converter 205 used to sample the received radar signal 108 using a specified sample rate and to convert analog information about the received radar signals, such as a receive frequency, to a digital format. The analog-to-digital converter 205 is also referred to as ADC 205. The ADC 205 can be implemented using a separate processor, multiple processors, and/or module configured to perform analog-to-digital radar signal processing in accordance with the present disclosure.

Figure 3:
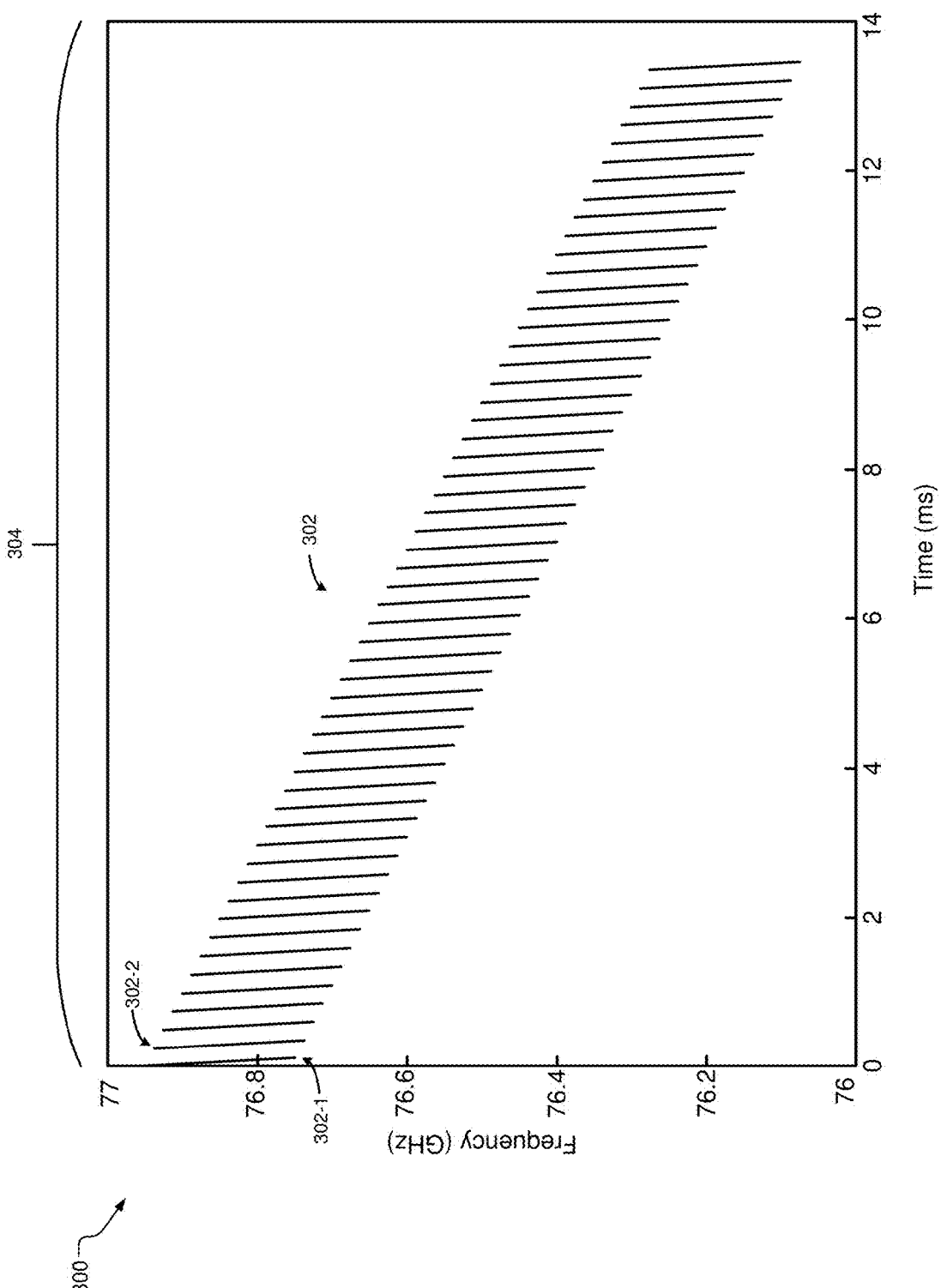
FIG. 3 is a graph illustrating transmitted radar signal chirps within a frame having a stepped-frequency waveform and constant pulse repetition period in accordance with the present disclosure.

The processor 200 can control the transmitter/receiver 204 to transmit radar signals 104 using a stepped-frequency waveform. With additional reference to FIG. 3, a graph 300 illustrating a number of transmitted radar signal chirps 302 is shown. In the example of FIG. 3, a single frame 304 having a frame length of 14 ms is shown for purposes of illustration, with time in milliseconds (ms) indicated along the horizontal axis and frequency in Gigahertz (GHz) shown along the vertical axis. While a single frame 304 is shown in FIG. 3, the radar system 100 is configured to transmit chirps 302 and process received signals over multiple subsequent frames. Each chirp 302 is transmitted at an initial frequency and then, over the course of the chirp 302, the frequency is modulated to a different end frequency. In the example of FIG. 3, a step-down waveform is shown wherein the initial frequency and end frequency of each chirp 302 is higher than the initial frequency and end frequency of the next subsequent chirp 302. For example, the initial and end frequencies of chirp 302-1 are higher than the initial and end frequencies of the next subsequent chirp 302-2. In this way, with the step-down waveform shown in the example of FIG. 3, the initial and end frequencies of the chirps 302 decrease over the period of the frame. While FIG. 3 illustrates a step-down waveform, a step-up wave form can alternatively be used wherein the initial and end frequencies of each chirp 302 are lower than the next subsequent chirp 302 so that the initial and end frequencies of the chirps 302 increase over the period of the frame 304.

In addition, the radar system 100 utilizes a time delay between each chirp 302, referred to as the pulse repetition period (PRP), between the end of one chirp 302 and the beginning of the next chirp 302. For example, the time period between the end of the transmission of chirp 302-1 and the beginning of the transmission of chirp 302-2 is referred to as the PRP. In the example of FIG. 3, a constant PRP is used such that the time delay between each chirp 302 is the same for all chirps 302 across the frame.

In addition, a leverage factor (LF) refers to the ratio of (i) the change in frequency for all chirps 302 across the frame 304 to (ii) the change in frequency for one chirp 302. For example, the change in frequency for all chirps 302 corresponds to the difference between the initial frequency of the first chirp 302-1 in the frame 304 and the initial frequency of the last chirp in the frame 304. The change in frequency of one chirp 302 corresponds to the difference between the initial frequency of a chirp 302 and the end frequency of that same chirp 302. In generally, although each chirp 302 within the frame 304 starts and ends at different initial and end frequencies, the amount of change in frequency for each chirp 302 is the same for all chirps 302 within the frame 304. The ratio of these two numbers, i.e., the change in frequency for all chirps 302 across the frame 304 divided by the change in frequency for one chirp, is referred to as the leverage factor (LF). In prior systems using conventional signal models, the resulting errors in the calculated range and range-rate increase as the LF of the frames increases.

In the present disclosure, the following abbreviations are used:

"c" refers to the speed of light;

"S" refers to the chirp slope, which is signed such that up chirp is positive corresponding to the frequency of the transmit signal increasing over the period of the chirp and down chirp is negative corresponding to the frequency of the transmit signal decreasing over the period of the chirp;

"$\Delta f$" refers to the frequency shift from chirp to chirp, which is signed such that up frame is positive corresponding to the initial and end frequencies increasing from chirp to chirp and down frame is negative corresponding to the initial and end frequencies decreasing from chirp to chirp;

"$f_0$" refers to the starting frequency of the ADC 205 across all frequency samples of a receive frame;

"$f_s$" refers to the sampling frequency, or sampling rate, of the ADC 205;

"PRP" refers to the pulse repetition period or time delay between adjacent chirps within a frame;

"M" refers to the number of samples within a particular chirp;

"K" refers to the number of chirps within a particular frame;

"m" refers to a particular sample within a particular chirp;

"k" refers to a particular chirp within a particular frame;

"$M_{RFFT}$" refers to the number of range FFT bins for processed receive signals used in the performance of range FFT processing;

"$K_{DFFT}$" refers to the number of Doppler FFT bins for processed receive signals used in the performance of Doppler FFT processing;

"p" and "q" refer to indices of a particular detection in the two-dimensional FFT map;

"p*" refers to a range fractional bin estimate;

"q*" refers to a Doppler fractional bin estimate;

"R" refers to range; and

"v" refers to velocity.

Figure 4:
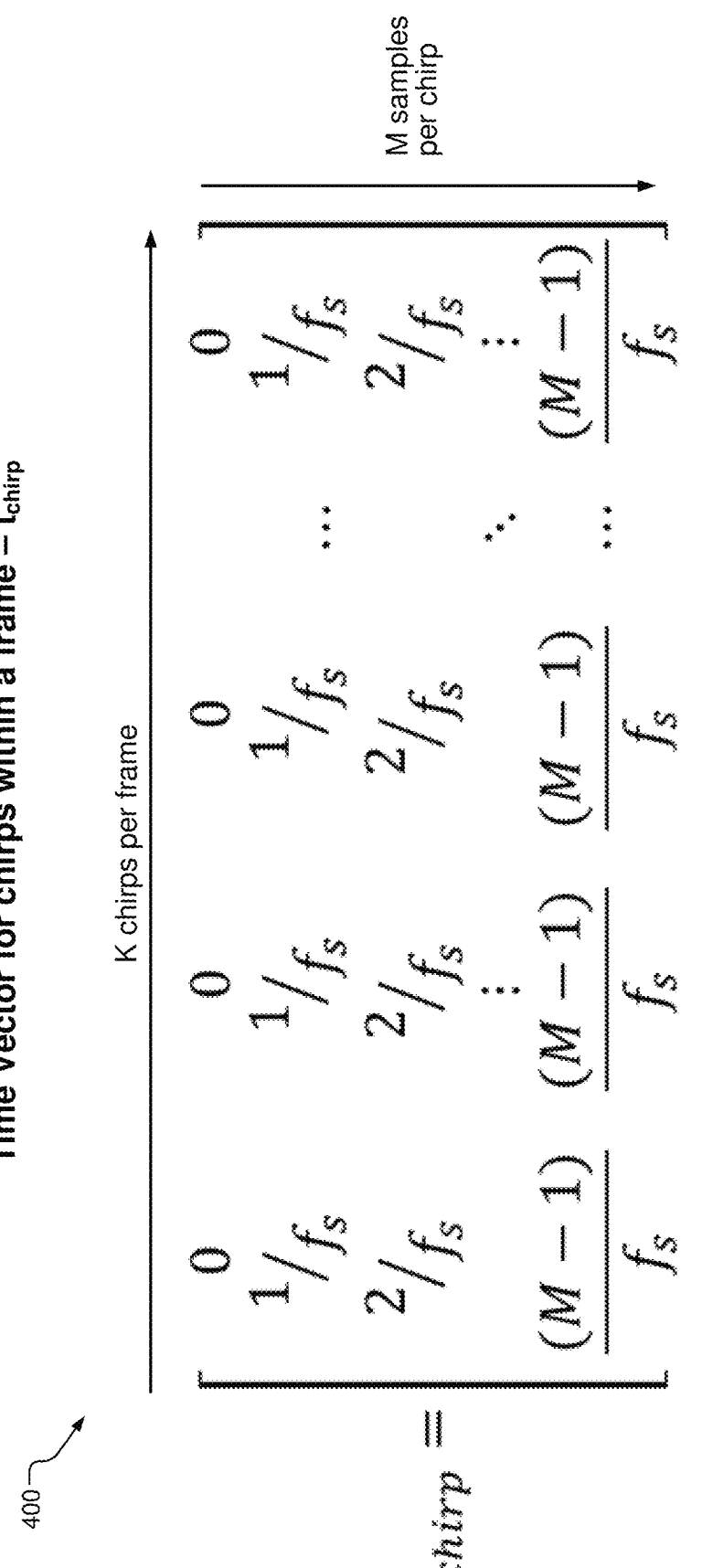
FIG. 4 illustrates values for a time vector of radar chirps within a frame in accordance with the present disclosure.
Figure 8A:
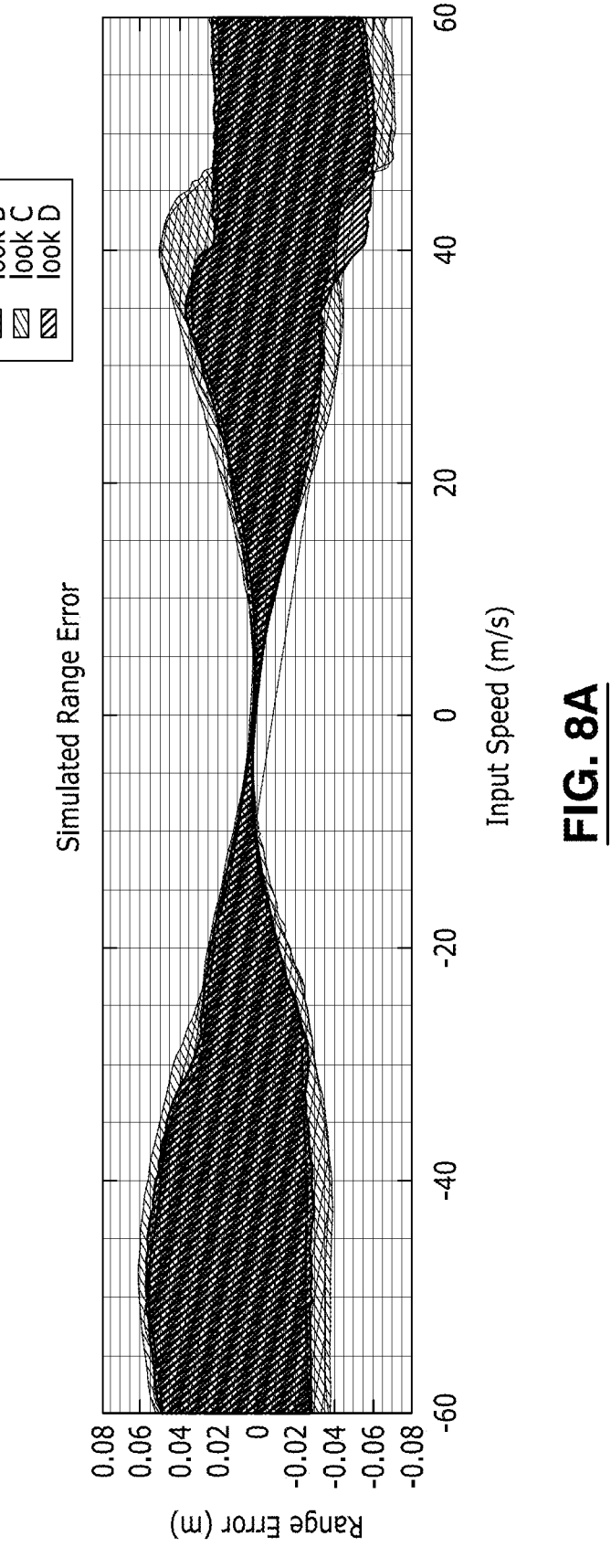
Figure 8B:
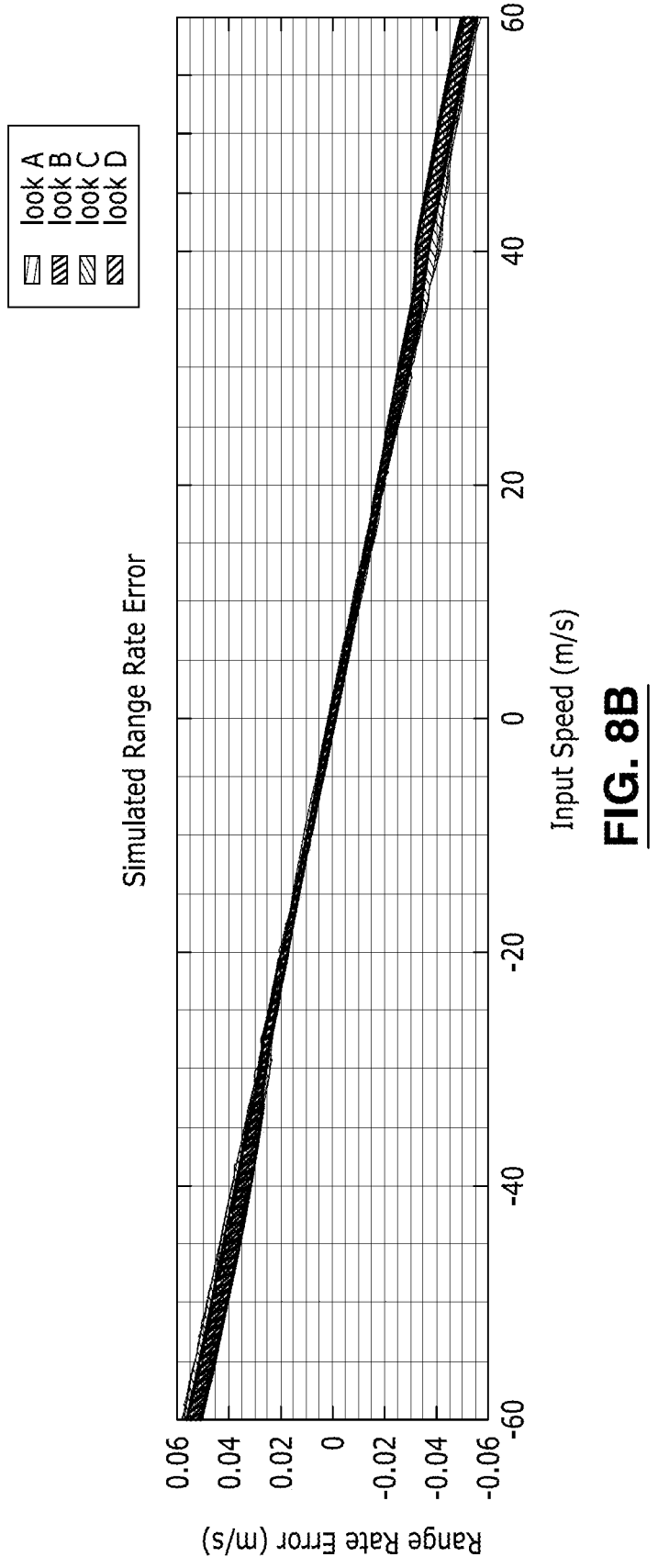
Figure 9A:
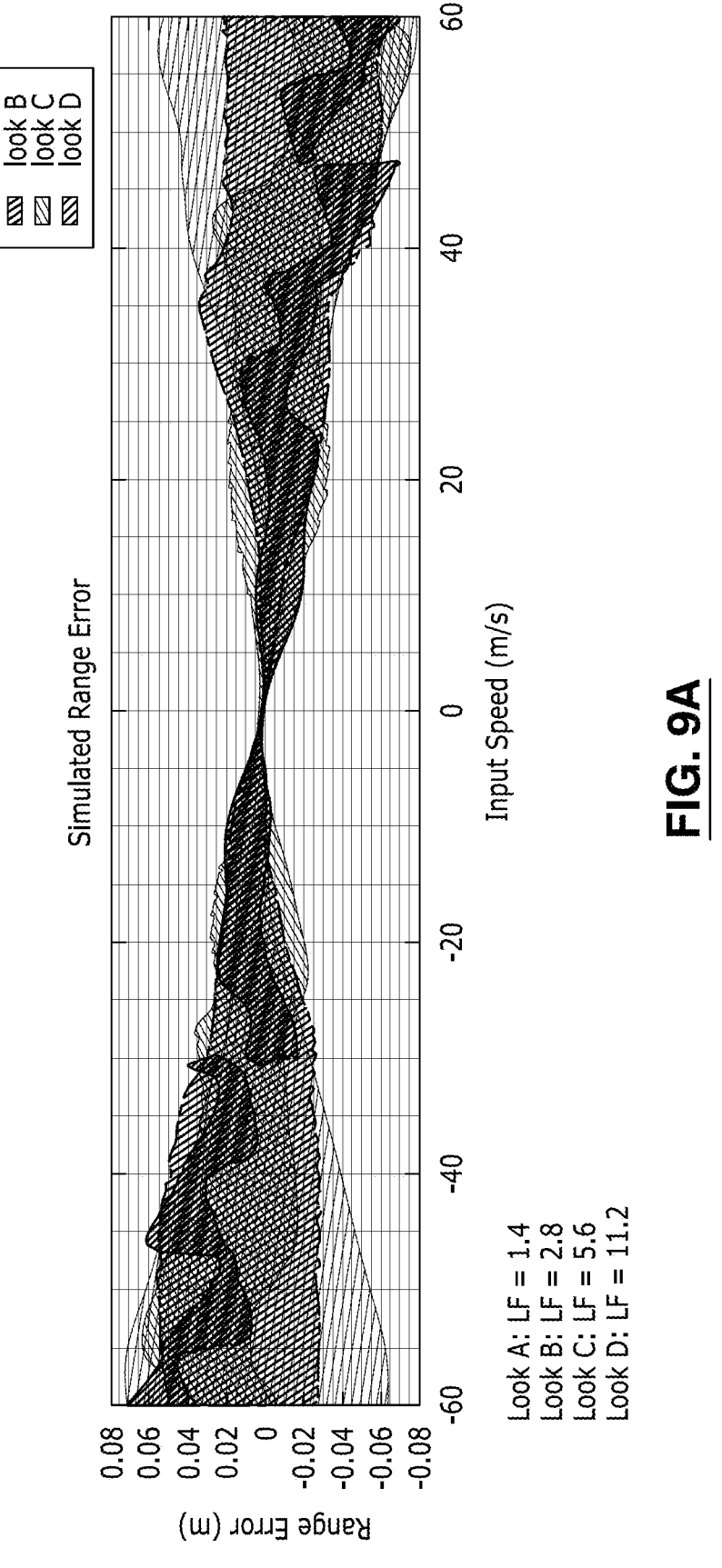
Figure 9B:
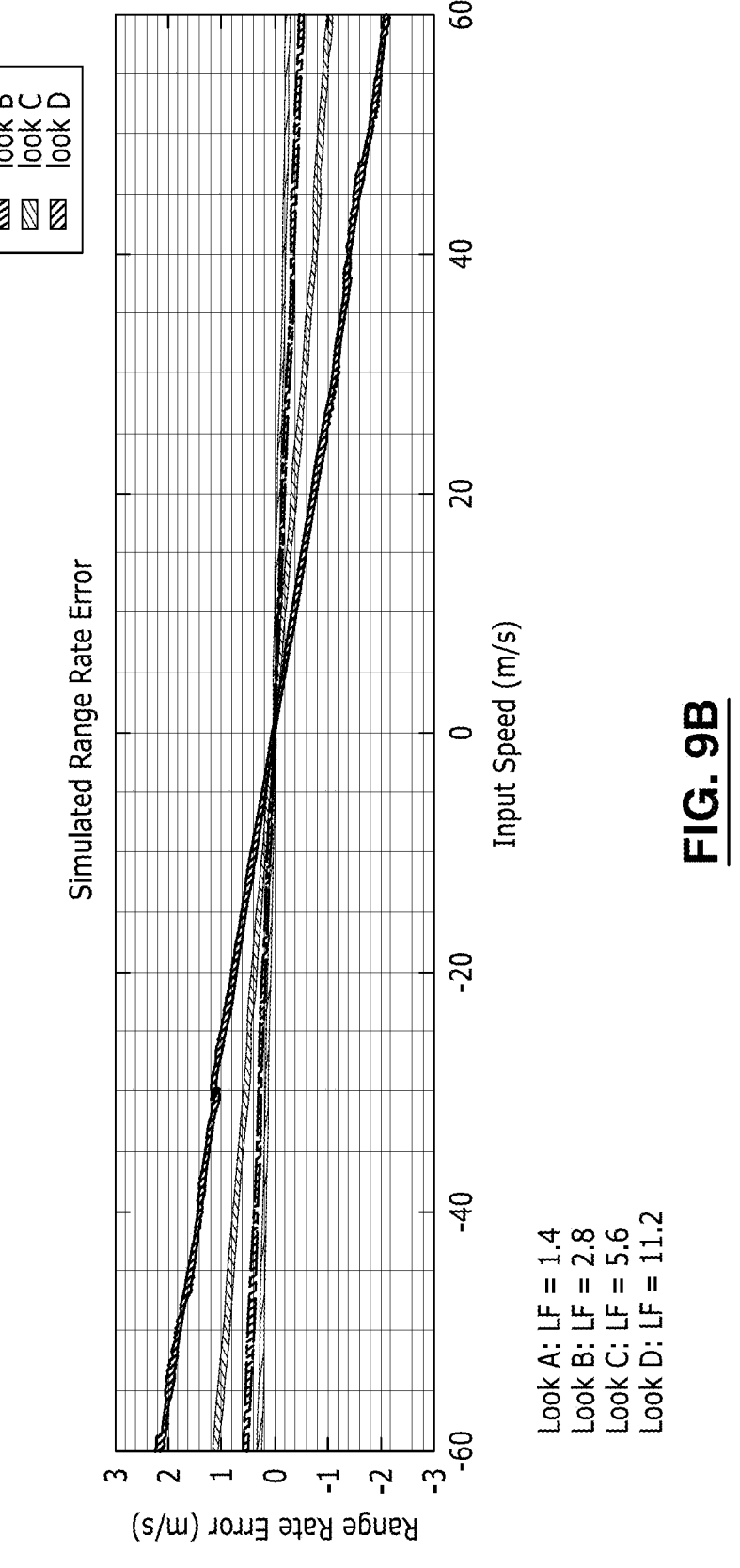

With reference to FIGS. 4 and 5, a time vector 400 for chirps, $t_{chirp}$, within a frame and a time vector 500 for the whole frame, $t_{frame}$, having M×K elements are illustrated. As shown in FIGS. 4 and 5, the time vectors 400, 500 are two-dimensional arrays, which are further processed for range FFT and Doppler FFT based on the signal model described in further detail below. As noted above, M refers to the number of samples per chirp and K refers to the number of chirps per frame. Each time stamp in the time vector 400 for chirps is referenced to the start of each chirp. Each time stamp in the time vector 500 for the whole frame is referenced to the start of the frame.

The signal model 208 utilized by the systems and methods of the present disclosure is described below with reference to the following formulas. In particular, a transmit signal instantaneous frequency, $f_{tx}$, is calculated based on the following Formulas 1 and 2:

$$f_{tx} = f_{start} + \text{Slope} \cdot t_{chirp} \qquad \text{Formula 1}$$

$$f_{start}(k) = f_0 + k \cdot \Delta f \qquad \text{Formula 2}$$

wherein $f_0$ is the start frequency of the whole frame and $\Delta f$ is the frequency step between chirps.

The transmit signal instantaneous phase, $\phi_{tx}$, is calculated based on the following Formula 3:

$$\Phi_{tx} = 2\pi \left( f_{start} \cdot t_{chirp} + \frac{\text{Slope}}{2} \cdot t_{chirp}^2 \right) \qquad \text{Formula 3}$$

which corresponds to integrating the frequency over time.

The receive signal instantaneous phase, $\phi_{rx}$, is calculated based on the following Formulas 4 and 5:

$$\Phi_{rx} = 2\pi \left[ f_{start}(t_{chirp} - \tau) + \frac{\text{Slope}}{2}(t_{chirp} - \tau)^2 \right] \qquad \text{Formula 4}$$

$$\tau = 2\frac{R + v \cdot t_{frame}}{c} \qquad \text{Formula 5}$$

wherein $\tau$ refers to the added time delay.

The intermediate frequency signal IF is calculated based on the following Formula 6:

$$IF = S_{rx} \cdot S_{tx}^* = e^{j(\Phi_{rx} - \Phi_{tx})} \qquad \text{Formula 6}$$

The terms of Formulas 3 and 5 can then be used for substitutions to reduce Formula 4 into the following Formulas 7-9:

$$\frac{\Phi_{rx}}{2\pi} = f_{start}(t_{chirp} - \tau) + \frac{S}{2}(t_{chirp} - \tau)^2 \qquad \text{Formula 7}$$

$$\frac{\Phi_{rx}}{2\pi} = f_{start}(t_{chirp} - \tau) + \frac{S}{2}(t_{chirp}^2 - 2 \cdot t_{chirp} \cdot \tau + \tau^2) \qquad \text{Formula 8}$$

$$\frac{\Phi_{rx}}{2\pi} = f_{start} \cdot t_{chirp} + \frac{S}{2} \cdot t_{chirp}^2 - 2 \cdot f_{start} \cdot \frac{R + v \cdot t_{frame}}{c} - \\ 2 \cdot S \cdot t_{chirp} \cdot \frac{R + v \cdot t_{frame}}{c} + 2 \cdot S \cdot \left( \frac{R + v \cdot t_{frame}}{c} \right)^2 \qquad \text{Formula 9}$$

The following higher orders terms from Formula 9, however, have negligible impact and can be omitted:

$$2 \cdot S \cdot \left( \frac{R + v \cdot t_{frame}}{c} \right)^2$$

Omitting those higher order terms, and using substitutions based on Formula 3, yields Formula 10:

$$\frac{\Phi_{rx}}{2\pi} = \frac{\Phi_{tx}}{2\pi} - \frac{2 \cdot f_{start} \cdot R}{c} - \frac{2 \cdot f_{start} \cdot t_{frame} \cdot v}{c} - \\ \frac{2 \cdot S \cdot t_{chirp} \cdot R}{c} - \frac{2 \cdot S \cdot t_{chirp} \cdot t_{frame} \cdot v}{c}$$

As shown in FIGS. 6 and 7, further derivations, substitutions, and approximations yield signal model terms that include both R and v.

Table 1 provides a number of Terms used in the Signal Model, along with the Term Type and a Term Description for each term.

TABLE 1

| Signal Model Terms | | |
|---|---|---|
| Term Type | Term | Term Description |
| Constant Phase Term | $-f_D \cdot R$ | Direct Current Component |
| Fast-Time Dimension Terms | $-f_{R_1} \cdot R \cdot \frac{m}{f_s}$ | Fast-Time Ranging Phase |
| | $-f_D \cdot v \cdot \frac{m}{f_s}$ | Intra-Chirp Doppler Phase |
| | $-f_{R_1} \cdot v \cdot \frac{m^2}{f_s^2}$ | Higher Order Term |
| Slow-Time Dimension Terms | $-f_{R_2} \cdot R \cdot k \cdot PRP$ | Slow-Time Ranging Phase |
| | $-f_D' \cdot v \cdot k \cdot PRP$ | Inter-Chirp Doppler Phase |

TABLE 1-continued

Signal Model Terms

| Term Type | Term | Term Description |
|---|---|---|
| | $-f_{R_2} \cdot v \cdot k^2 \cdot PRP^2$ | Higher Order Term |
| Coupling Term | $-\left(f_{R_1} + f_{R_2}\right) \cdot v \cdot \dfrac{m}{f_s} \cdot k \cdot PRP$ | Range Migration (Both Intra-Chirp and Inter-Chirp) |

The present disclosure utilizes a signal model that includes higher order terms in both the fast-time dimension and the slow-time dimension. As further noted above, the fast-time dimension corresponds to the time period of an individual chirp while the slow-time dimension corresponds to the time period of an individual transmit frame. In Table 1 above, terms that include "m," which corresponds to a particular sample within a chirp, are referred to as fast-time dimension terms while terms that include "k," which corresponds to a particular chirp within a frame, are referred to as slow-time dimension terms. Terms that include both "m" and "k" are referred to as coupling terms as they include terms from both the fast-time dimension and the slow-time dimension. The "m" fast-time dimension term, for example, can correspond to an index that indicates a particular sample within a particular radar chirp. The "k" slow-time dimension term can correspond to an index that indicates a particular chirp within the frame.

In addition, the signal model of the present disclosure includes a higher order term in the slow-time dimension, as shown in Table 1 above, and here:

$$\text{Slow−Time Dimension Higher Order Term: } -f_{R_2} \cdot v \cdot k^2 \cdot PRP^2$$

This slow-time dimension term is a "higher order" term insofar as the "k" value, which corresponds to a particular chirp within a frame, is a second degree, squared term. In other words, the slow-time dimension higher order term includes a quadratic k term. This is distinguishable from prior signal models that do not include a higher order term in the slow-time dimension.

In addition, the signal model of the present disclosure also includes a higher order term in the fast-time dimension, as shown in Table 1 above, and here:

$$\text{Fast−Time Dimension Higher Order Term: } -f_{R_1} \cdot v \cdot \frac{m^2}{f_s^2}$$

This fast-time dimension term is a "higher order" term insofar as the "m" value, which corresponds to a particular sample within a chirp, is a second degree, squared term. In other words, the fast-time dimension higher order term includes a quadratic m term.

In this way, signal model in accordance with the present disclosure takes into consideration the above-noted quadratic terms when interpreting the target position in the two-dimensional FFT map into range and range rate information.

The complex Intermediate Frequency (IF) formula is shown here as Formula 11:

$$e^{j\Phi_{IF}} = e^{-j2\pi\left[f_D \cdot R + f_{R_1} \cdot R \cdot \frac{m}{f_s} + f_D \cdot v \cdot \frac{m}{f_s} + f_{R_1} \cdot v \cdot \frac{m^2}{f_s^2} + f_{R_2} \cdot R \cdot k \cdot PRP + f_D \cdot v \cdot k \cdot PRP + f_{R_2} \cdot v \cdot k^2 \cdot PRP^2 + \left(f_{R_1} + f_{R_2}\right) \cdot v \cdot \frac{m}{f_s} k \cdot PRP\right]}$$

In addition, the formula for a two-dimensional Doppler FFT is shown here as Formulas 12-14 as follows:

$$Z(p, q) = \sum_{k=0}^{K-1} \sum_{m=0}^{M-1} e^{j\Phi_{IF}} e^{-j\frac{2\pi}{M}mp} e^{-j\frac{2\pi}{K}kq} \qquad \text{Formula 12}$$

$$Z(p, q) = \sum_{k=0}^{K-1} \sum_{m=0}^{M-1} e^{-j2\pi\left[f_D \cdot R + f_{R_1} \cdot R \cdot \frac{m}{f_s} + f_D \cdot v \cdot \frac{m}{f_s} + f_{R_1} \cdot v \cdot \frac{m^2}{f_s^2} + f_{R_2} \cdot R \cdot k \cdot PRP + f_D \cdot v \cdot k \cdot PRP + f_{R_2} \cdot v \cdot k^2 \cdot PRP^2 + \left(f_{R_1} + f_{R_2}\right) \cdot v \cdot \frac{m}{f_s} \cdot k \cdot PRP + \frac{mp}{M} + \frac{kq}{K}\right]} \qquad \text{Formula 13}$$

$$Z(p, q) = \sum_{k=0}^{K-1} \sum_{m=0}^{M-1} e^{-j2\pi\Phi(m,k)} \qquad \text{Formula 14}$$

As shown above, Formula 13 includes the higher order terms from both the slow-time dimension and the fast-time dimension, noted as:

$$\text{Slow−Time Dimension Higher Order Term: } f_{R_2} \cdot v \cdot k^2 \cdot PRP^2$$

$$\text{Fast−Time Dimension Higher Order Term: } f_{R_1} \cdot v \cdot \frac{m^2}{f_s^2}$$

In performing the range-Doppler FFT in accordance with the present disclosure, the processor 200 searches peaks within the two-dimensional FFT map by the above Formulas 12-14 and determines the locations of the peaks in the two-dimensional FFT map and the bin indices (p, q) and (p*, q*) of the peaks after the fractional bin estimate. In particular, the processor 200 sets the following Formula 15 for the fast-time dimension equal to 0:

$$\frac{d\Phi(m, k)}{dm} = \frac{1}{f_s}\left[f_{R_1} \cdot R + f_D \cdot v + \left(f_{R_1} + f_{R_2}\right) \cdot v \cdot k \cdot PRP\right] + \qquad \text{Formula 15}$$

-continued $$2 \cdot f_{R_1} \cdot v \cdot \frac{m}{f_s^2} + \frac{p}{M} = 0$$

This can be considered where the phasor $e^{-j2\pi\phi(m,\ k)}$ rotates the slowest in the fast-time dimension. This results in Formula 16 as follows:

$$p(m, k) = -\frac{M}{f_s}\left[f_{R_1} \cdot R + f_D \cdot v + \right. \tag{Formula 16}$$

$$\left. (f_{R_1} + f_{R_2}) \cdot v \cdot k \cdot PRP\right] - 2M \cdot f_{R_1} \cdot v \cdot \frac{m}{f_s^2}$$

Empirically, p* can be set equal to the average of p(m,k), according to the following Formula 17:

$$p\ast = \sum_{k=0}^{K-1}\sum_{m=0}^{M-1}\frac{p(m, k)}{MK} \tag{Formula 17}$$

The processor 200 then sets the following Formula 18 for the slow-time dimension equal to 0:

$$\frac{d\Phi(m, k)}{dk} = f_{R_2} \cdot R \cdot PRP + f_D \cdot v \cdot PRP + \tag{Formula 18}$$

$$2 \cdot f_{R_2} \cdot v \cdot k \cdot PRP^2 + (f_{R_1} + f_{R_2}) \cdot v \cdot \frac{m}{f_s} \cdot PRP + \frac{q}{K} = 0$$

This is where the phasor $e^{-j2\pi\phi(m,\ k)}$ rotates the slowest in the slow-time dimension, which results in the following Formula 19:

$$q(m, k) = -K \cdot PRP \cdot \left[f_{R_2} \cdot R + f_D \cdot v + \right. \tag{Formula 19}$$

$$\left. (f_{R_1} + f_{R_2}) \cdot v \cdot \frac{m}{f_s}\right] - 2K \cdot f_{R_2} \cdot v \cdot k \cdot PRP^2$$

Empirically, q* can be set equal to the average of q(m,k), according to the following Formula 20:

$$q\ast = \sum_{k=0}^{K-1}\sum_{m=0}^{M-1}\frac{q(m, k)}{MK} \tag{Formula 20}$$

The processor 200 then utilizes the following formulas Formula 21 and Formula 22 of the signal model to determine $F_{bFast}$ and $F_{bSlow}$:

$$F_{bFast} = p\ast \frac{f_s}{M_{RFFT}} \tag{Formula 21}$$

$$= -\left[f_{R_1} \cdot R + f_D \cdot v + (f_{R_1} + f_{R_2}) \cdot \frac{K-1}{2} \cdot PRP \cdot v + \right.$$

$$\left. f_{R_1} \cdot (M-1) \cdot \frac{1}{f_s} \cdot v\right]$$

$$= -f_{R_1} \cdot R - f_{D_1} \cdot v$$

$$F_{bSlow} = q\ast \frac{\frac{1}{PrP}}{K_{DFFT}} \tag{Formula 22}$$

-continued $$= -\left[f_{R_2} \cdot R + f_D \cdot v + (f_{R_1} + f_{R_2}) \cdot \frac{M-1}{2} \cdot \frac{1}{f_s} \cdot v + \right.$$

$$\left. f_{R_2} \cdot (K-1) \cdot PRP \cdot v\right]$$

$$= -f_{R_2} \cdot R - f_{D_2} \cdot v$$

$$\text{wherein } f_{R_1} = \frac{2 \cdot S}{c}, f_{R_2} = \frac{2\frac{\Delta f}{PRP}}{c}, f_D = \frac{2 \cdot f_0}{c},$$

$$\text{wherein } f_{D_1} = f_D + (f_{R_1} + f_{R_2}) \cdot \frac{K-1}{2} \cdot PRP + f_{R_1} \cdot (M-1) \cdot \frac{1}{f_s}, \text{ and}$$

$$\text{wherein } f_{D_2} = f_D + (f_{R_1} + f_{R_2}) \cdot \frac{M-1}{2} \cdot \frac{1}{f_s} + f_{R_2} \cdot (K-1) \cdot PRP,$$

In accordance with the present disclosure, in Formula 22 above the contributions of the higher order terms (shown at $$f_{R_1} \cdot (M-1) \cdot \frac{1}{f_s}$$

and $f_{R_2} \cdot (K-1) \cdot PRP$ are included in the model and are not ignored. Based on Formulas 21 and 22, and with p and q known, the processor 200 is then able to utilize these two linear equations to solve for the two unknowns of range R and velocity v.

In this way, the range and range-rate information of the object is determined and the range R and velocity v of the object are accurately estimated based on the above-described signal model in accordance with the present disclosure. Further, the present disclosure provides a signal model that includes higher order terms in the slow-time dimension as well as the fast-time dimension and, as compared with previous signal models, more accurately determines estimates for range and range rate based on received signals from a radar system 100 utilizing a stepped frequency waveform with a constant pulse repetition period (PRP).

In this way, as discussed above, the signal model according to the present disclosure takes into consideration quadratic terms in both the slow-time dimension and the fast-time dimension when interpreting the target position of the object in the two-dimensional FFT map into range and range rate. Consideration of these terms provides for increased accuracy and substantial reductions in the resulting errors for estimated range and range rate. For example, FIGS. 8A and 8B include graphs illustrating the simulated range and range rate errors when using a signal model developed for a stepped-frequency waveform (SFW) having a varied PRP in a radar system that utilizes an SFW with a constant PRP. In other words, the errors illustrated in FIGS. 8A and 8B result from using a signal model that does not include, or that ignores, the quadratic or second-degree terms in the slow-time dimension with a radar system that utilizes an SFW with a constant PRP. As shown in FIG. 9, the range rate error suffers greater degradation when the SFW leverage factor (LF) increases.

Figure 10A:
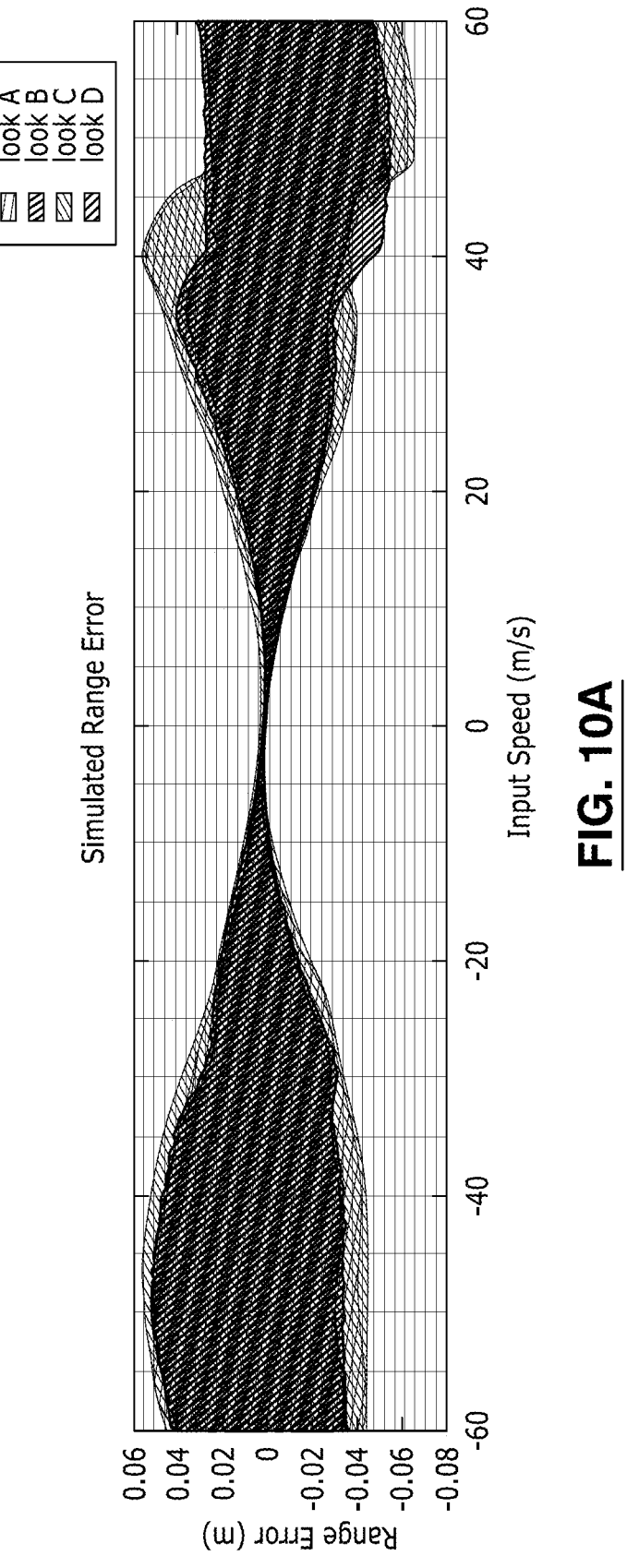
Figure 10B:
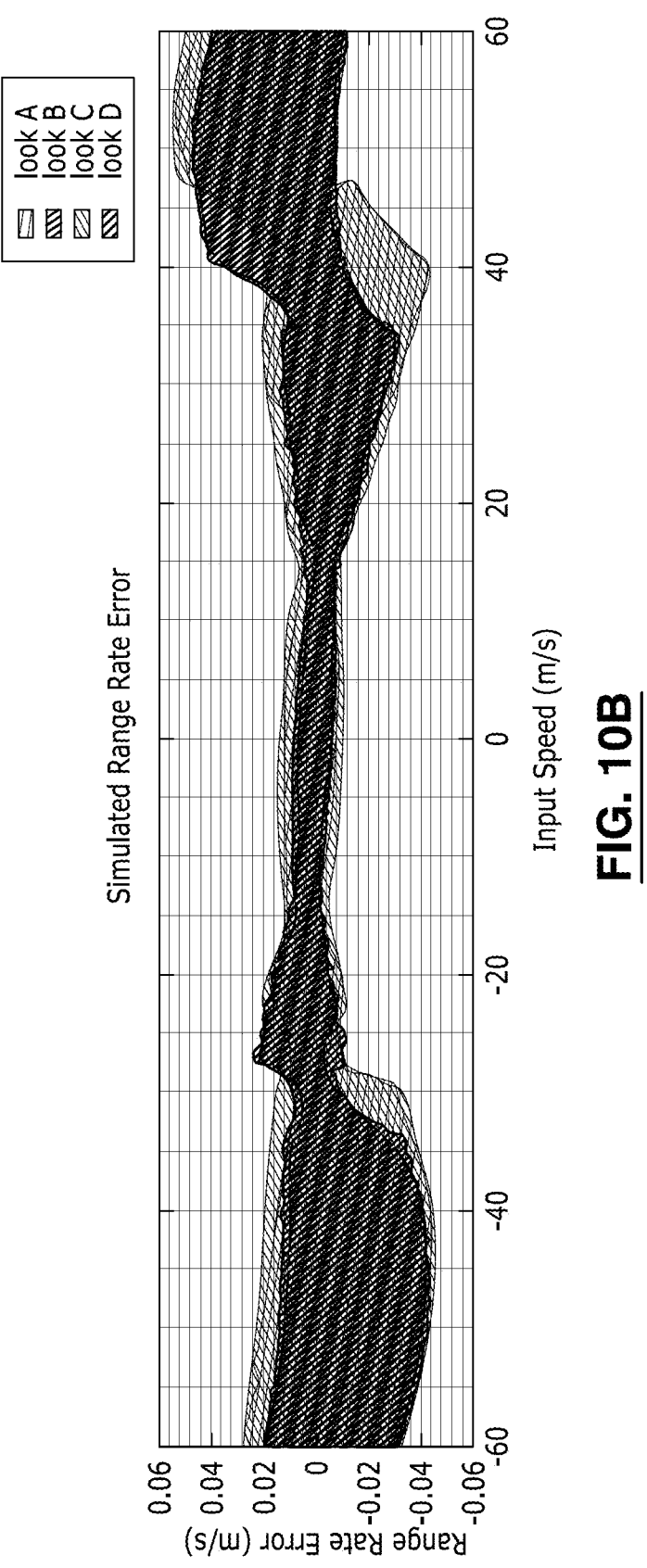
Figure 11A:
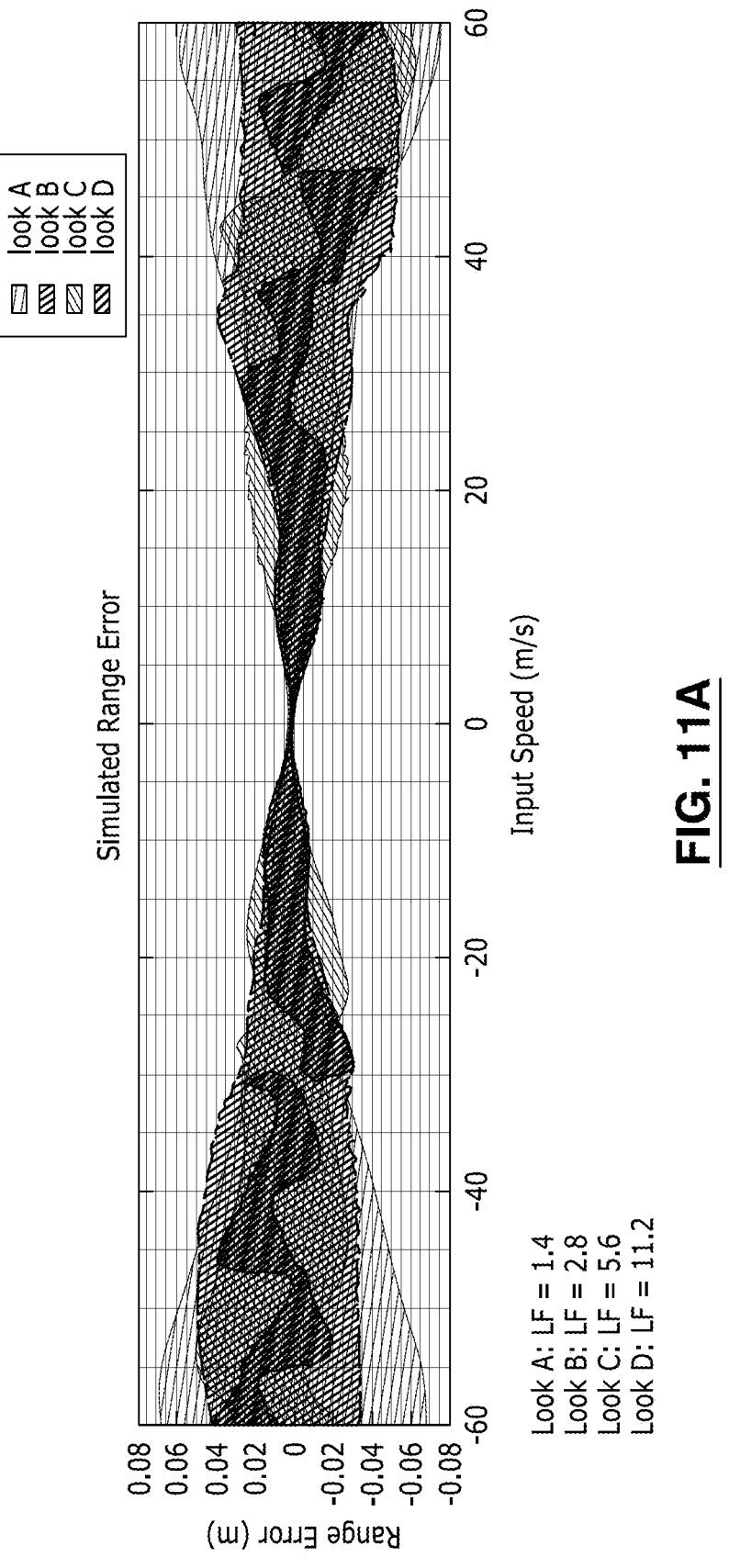
Figure 11B:
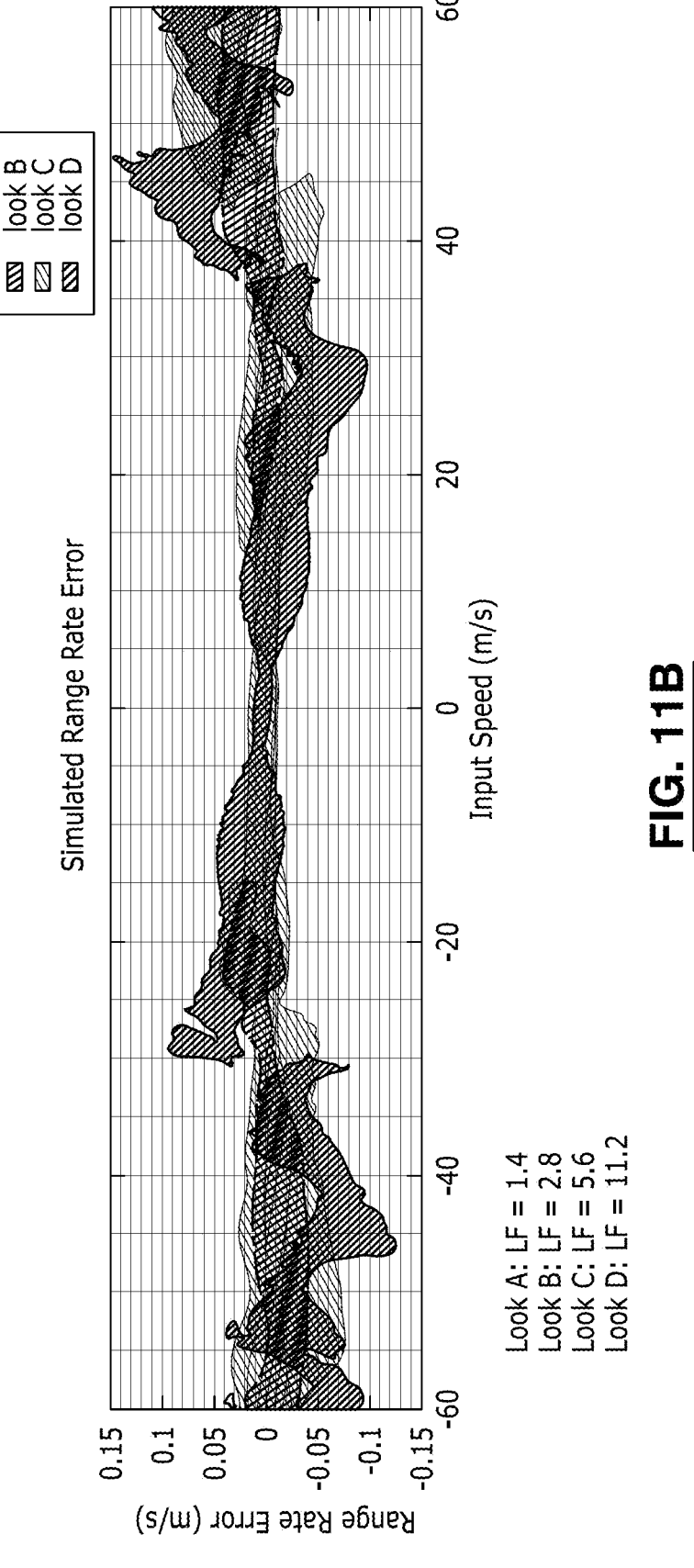

The signal models in accordance with the present disclosure, on the other hand, take into consideration the quadratic or second-degree terms in the slow-time dimension, as well as in the fast-time dimension, when interpreting the target position in the two-dimensional FFT map into range and range rate information. Moreover, the signal models in accordance with the present disclosure provide improved accuracy and reduced error rates, as compared with the prior models when used with radar systems utilized SFW and constant PRP. FIGS. 10A and 10B, for example, includes graphs illustrating the simulated range and range rate errors when using a signal model in accordance with the present disclosure, including utilizing quadratic or second-degree terms in both the slow-time dimension and the fast-time dimension with a radar system utilizing an SFW and constant PRP. As compared with prior systems, accuracy is improved and resulting errors are reduced. In addition, FIGS. 11A and 11B illustrate utilizing a signal model in accordance with the present disclosure with a radar system utilizing an SFW and constant PRP with increased LFs. Again, as compared with prior systems, accuracy is improved and resulting errors are reduced.

The foregoing description of the embodiments has been provided for purposes of illustration and description and is not intended to be exhaustive or to limit the disclosure. Individual elements or features of a particular embodiment are generally not limited to that particular embodiment, but, where applicable, are interchangeable and can be used in another embodiment, even if not specifically shown or described. The various embodiments may also be varied in many ways. Such variations are not to be regarded as a departure from the disclosure, and all such modifications are intended to be included within the scope of the disclosure. Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough and will fully convey the scope to those who are skilled in the art. Specific details are set forth, including examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference and not to indicate a fixed order.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard (including Core Specification versions 3.0, 4.0, 4.1, 4.2, 5.0, and 5.1 from the Bluetooth SIG) from the Bluetooth Special Interest Group (SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media.

The apparatuses and methods described in this application may be partially or fully implemented by a special purpose computer created by configuring a general-purpose computer to execute one or more particular functions embodied in computer programs. Such apparatuses and methods may be described as computerized apparatuses and computerized methods. The functional blocks and flowchart elements described above serve as software specifications, which can be translated into computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A radar system comprising a processor and memory configured to:

control a transmitter/receiver to transmit radar signals within at least one frame having a plurality of radar chirps, the plurality of radar chirps having a stepped frequency waveform such that an initial transmit frequency and an end transmit frequency is changed for each subsequent chirp within the plurality of radar chirps, and the plurality of radar chirps having a constant pulse repetition period between chirps;

control the transmitter/receiver to receive and sample radar signals of the plurality of radar chirps reflected from at least one object to generate a plurality of receive values from the received and sampled radar signals;

perform range fast Fourier transform (FFT) processing and Doppler FFT processing on the plurality of receive values to generate range FFT values and Doppler FFT values;

estimate range and range-rate information about the at least one object based on the range FFT values and Doppler FFT values using a signal model; and determine information about the at least one object based on the estimated range and range-rate information, the information about the at least one object including at least one of a location, a size, an orientation, a velocity, and an acceleration of the at least one object;

wherein:

the signal model includes at least one formula for a two-dimensional FFT map having (1) at least one quadratic fast-time dimension term ($m^2$), with m corresponding to an index indicating individually received samples within each radar chirp of the plurality of radar chirps reflected from the at least one object and (2) at least one quadratic slow-time dimension term ($k^2$), with k corresponding to an index indicating individual radar chirps within the plurality of radar chirps reflected from the at least one object; and the radar system is located in a vehicle and the information about the at least one object is communicated to at least one of an autonomous driving system and a driver assistance system that controls at least one of a steering system, a braking system, and a throttle system of the vehicle based on the information about the at least one object.

2. A method comprising:

transmitting, with a transmitter/receiver controlled by a processor and memory of a radar system, radar signals within at least one frame having a plurality of radar chirps, the plurality of radar chirps having a stepped frequency waveform such that an initial transmit frequency and an end transmit frequency is changed for each subsequent chirp within the plurality of radar chirps and the plurality of radar chirps having a constant pulse repetition period between chirps;

receiving and sampling, with the transmitter/receiver, radar signals of the plurality of radar chirps reflected from at least one object to generate a plurality of receive values from the received and sampled radar signals;

performing, with the processor and memory of the radar system, range fast Fourier transform (FFT) processing and Doppler FFT processing on the plurality of receive values to generate range FFT values and Doppler FFT values;

estimating, with the processor and memory of the radar system, range and range-rate information about the at least one object based on the range FFT values and Doppler FFT values using a signal model;

determining, with the processor and memory of the radar system, information about the at least one object based on the estimated range and range-rate information, the information about the at least one object including at least one of a location, a size, an orientation, a velocity, and an acceleration of the at least one object;

wherein:

the signal model includes at least one formula for a two-dimensional FFT map having (1) at least one quadratic fast-time dimension term $(m^2)$, with m corresponding to an index indicating individually received samples within each radar chirp of the plurality of radar chirps reflected from the at least one object and (2) at least one quadratic slow-time dimension term $(k^2)$, with k corresponding to an index indicating individual radar chirps within the plurality of radar chirps reflected from the at least one object; and the radar system is located in a vehicle and the information about the at least one object is communicated to at least one of an autonomous driving system and a driver assistance system that controls at least one of a steering system, a braking system, and a throttle system of the vehicle based on the information about the at least one object.

* * * * *